United States Patent
Fujii et al.

(10) Patent No.: US 6,346,670 B1
(45) Date of Patent: Feb. 12, 2002

(54) SOLAR BATTERY SYSTEM

(75) Inventors: Takashi Fujii, Katano; Hironori Namioka, Osaka, both of (JP)

(73) Assignee: Haneda Humepipe Co., Ltd., Tokyo (JP)

( * ) Notice: Subject to any disclaimer, the term of this patent is extended or adjusted under 35 U.S.C. 154(b) by 0 days.

(21) Appl. No.: 09/553,755

(22) Filed: Apr. 21, 2000

(30) Foreign Application Priority Data

Apr. 30, 1999 (JP) ............................................. 11-124751

(51) Int. Cl.[7] .............................. H02J 7/00; H01L 31/04
(52) U.S. Cl. ....................... 136/293; 136/244; 136/291; 320/124; 320/127; 320/128; 320/135
(58) Field of Search ................................. 136/293, 244, 136/291; 320/101, 124, 127, 128, 135

(56) References Cited

U.S. PATENT DOCUMENTS

| | | | | |
|---|---|---|---|---|
| 4,240,021 A | * | 12/1980 | Kashima et al. ............. | 320/101 |
| 5,751,133 A | * | 5/1998 | Sato et al. .................. | 320/101 |
| 6,051,954 A | * | 4/2000 | Nagao et al. ................ | 320/101 |

FOREIGN PATENT DOCUMENTS

EP          1049232 A2 * 11/2000

* cited by examiner

*Primary Examiner*—Alan Diamond
(74) *Attorney, Agent, or Firm*—Townsend & Banta

(57) ABSTRACT

A reliable, long lasting solar battery system capable of collecting and storing long-term data on charge and discharge is provided. The system includes a solar battery having a charge control means, and a storage battery, wherein the charging volume of the storage battery is detected by a charge quantity detecting means. Further, a discharge quantity of the storage battery is detected by a discharge quantity $3c$. The detected analog signal is sent through an external interface means to an operation and decision means. An operation and decision means controls a discharge quantity control device, wherein the detected signal, as well as other signals, are processed, together with appropriate various command signals sent by a storage means in accordance with a load or loads, and are outputted to a discharge control means. Further, data on present and past command signals, including the result of past control, are stored in order of time into the storage means. A control signal for controlling the output discharge quantity controls the discharge output means in accordance with the charge quantity of the discharge control means, and the discharge output means supplies the needed electric power to a load.

15 Claims, 3 Drawing Sheets

FIG. 3

| (1) LIGHT AND ILLUMINATION FIELD |
|---|
| · ROAD RIVET<br>· SIGNPOSTING<br>· ESCAPE SIGN<br>· SIGNBOARD<br>· LIGHT FOR NO THROUGHFAREFOR VEHICLES<br>· LIGHT FOR EMERGENCY<br>· NAMEPLATE<br>· GARDEN LIGHT<br>· FOOT LIGHT<br>· STREET LIGHT<br>· FOR CRIME-PREVENTION<br>· LIGHT FOR FIREPLUG<br>· BUOY LANTHANUM ON THE SEA<br>· BUS STATION LIGHTING<br>· LIGHT FOR TEMPORARY TOILET<br>· LIGHT FOR GONDOLA<br>· FISH-LURING LIGHT |

| (2) POWER FIELD |
|---|
| · PUMP<br>· FOUNTAIN<br>· SPRINKLER<br>· VENTILATION FAN<br>· GATE OF FLOODGATE OF RIVERS GATE OF PARKING ZONE<br>· SKI GATE<br>· THE DOOR OF A GATE<br>· GRAGE SHUTTER<br>· BLIND SHUTTER<br>· FLAGPOLE<br>· SIGN OF ROTATION<br>· AUTOMATIC OPENING AND SHUTTING DOOR<br>· SOLAR CAR<br>· CAN PRESS |

| (3) INFORMATION AND COMMUNICATION FIELD |
|---|
| · OBSERVATION SYSTEM<br>· RADIO REPEATER<br>· PUBLIC TELEPHONE<br>· EMERGENCY ALARM SYSTEM<br>· MONITOR CAMERA CRIME PREVENTION DEVICE<br>· BLIND PERSON GUIDE SYSTEM<br>· WATCH<br>· THERMOMETER<br>· WIND FORCE METER<br>· MESSAGE BOARD FOR INFORMATION<br>· ROAD-FREEZING DISPLAY<br>· REMOTE CONTROL DEVICE |

| (4) OTHERS FIELD |
|---|
| · PORTABLE RADIOTELEPHONE POWER SOURCE<br>· STORAGE BATTERY<br>· GRAZING GATE<br>· PREVENTING MEANS OF DAMAGE BY BIRD<br>· BGM EQUIPMENT<br>· VINYL HOUSE<br>· TOY<br>· GOODS<br>· AUTOMATIC VENDING MACHINE<br>· ELECTRONIC LOCK<br>· MONUMENT |

SOLAR BATTERY SYSTEM

CROSS-REFERENCE TO RELATED APPLICATION

This invention claims right of priority under 35 U.S.C. §119 of foreign Japanese patent application No. 124,751 of 1999 (Heisei 11), filed on the Apr. 30, 1999.

FIELD OF THE INVENTION

The present invention relates to a solar battery system in which electric energy generated by a solar battery is stored in a storage battery, and the stored electric energy is supplied to a load.

BACKGROUND OF THE INVENTION

In a conventional solar battery system, a solar battery is installed at an angle of 45 to the ground in a southerly facing direction. Generally, such conventional solar battery systems comprise a storage battery, wherein the electrical output of the solar battery produced from the average duration of sunshine per one day obtained from meteorological observation data in Japan (usually about three hours) is stored in the storage battery, and the stored electric energy is used as the power source.

In such a system, during rainy or cloudy weather, the output of the solar battery is so weak that sufficient charging of the storage battery is impossible. Hence, such a conventional solar battery system is inoperable during rainy or cloudy weather. Therefore, in order to compensate for poor weather (referred to herein as "unsunniness compensation") the capacity of a storage battery is increased, and in rainy or cloudy weather, stored electric energy is used as the power source. In such case, for example, if poor weather persists for 5 to 30 days, the capacity of the storage battery must be 5 to 30 times that of the needed daily electric power.

Such a conventional solar battery system, as described above, has been used for a long time. However, as the effective use of a conventional solar battery system at locations where power sources do not exist becomes popular, weather/environmental conditions which limit the use of solar battery systems become important factors to consider, since they pose basic problems that limit the installation of a solar battery system. For example, prior to installation many factors must be considered, such as the placement of the solar battery in a sunny location at an angle of 45° to the ground facing south, installation of a solar battery in a location that does not mar the view, and that charge and discharge operation trouble is caused by snow lying on the surface of a solar battery.

That a solar battery system is convenient and safe are important conditions in the design of same, for the spread of use of such systems. However, speaking of conditions of design, it goes without saying that a new solar battery system is desired in which the charge and discharge operation is assured even in such cases where the solar battery is placed in the shade, and/or in rainy or cloudy weather, and conditions on the installation of a solar battery outside do not matter, such as installation of a solar battery perpendicular to the ground in snowy areas.

Accordingly, a solar battery system is disclosed, for example, in Japanese patent laying-open No. 177683 of 1995 (Heisei 7), which includes a combination of an electric double layer condenser as a storage battery and a large capacity solar battery which generates a given output even under weak solar light, in the shade, in rainy weather, etc. The solar battery system can be used for long periods of time even if chargings are repeated every day regardless of weather, since the number of charging and discharging cycles of the electric double layer condenser is in the hundreds of thousands. Further, since charging is possible even in the shade and in rainy weather, the installation location of the solar battery is irrelevant. Thus, the solar battery system may be made small and inexpensive.

However, the ratio of power output of a solar battery system placed in an ideal location facing the south versus a solar battery system placed in the shade in rainy weather is generally about $\frac{1}{20}$. In the case of the above two examples, in order to generate sufficient needed daily electric energy, power output of the solar battery system placed in the shade in rainy weather must be about 8 times as large as the solar battery system placed in an ideal location facing south, necessitating a large and more expensive solar battery system.

With regards to theoretical values, assuming daily needed electrical power output is 10 Wh/day, the power output of the solar battery system in all ideal location facing the south=10 Wh/3h (the average duration of sunshine per day)=3 W, while power output of the solar battery system located in the shade in rainy weather={10 Wh/8h (charging time in the daytime)}×20 ((damping correction coefficient in the shade in rainy weather)=25 W. Accordingly, a solar battery system of large-size and large-output is needed.

Further, in a solar battery system which includes a combination of a storage battery having the capacity to store the daily required electric energy and a solar battery capable of charging the storage battery even in the shade in rainy weather, the operation of the solar battery system in all weather conditions is assured. However, although the solar battery system is placed in a location facing south and is large-sized, the storage battery is quickly charged with a sufficient daily electric energy, after charging, surplus output of the solar battery remains and is released as useless energy. Therefore, such a solar battery system is inefficient and uneconomical.

Even if the capacity of the storage battery is increased to avoid the wasteful release of valuable charged energy, the output of discharged electricity is constant, which ensures charge and discharge in case of the poor weather conditions. Even if weather or installation location of the solar battery is changed, the output of discharged power is constant and cannot be increased. As a result, such a solar battery system is uneconomical and performs only simple function.

Moreover, although a conventional solar battery system has an effective face, the conventional battery system needs a wide area for the installation thereof, is large-sized and high-priced, therefore uneconomical. Further, conventional solar battery systems are designed to deliver simply a constant supply of electric power determined by the load needed to be affected, and provide merely an intermittent constant level of electric power. The output of the solar battery system, the charging state of the storage battery, the quantity of electric power needed based on load and the control of charge and discharge, were not necessarily performed and/or considered.

SUMMARY OF THE INVENTION

The present invention is provided in consideration of the above-mentioned problems, and provides that although the quantity of power charged to a storage battery changes according to the output of a solar battery, which itself depends on the state of solar radiation at the location of the installation of the solar battery, the output discharge quantity is automatically controlled in accordance with the changing charge quantity, so that effective and wise control operation of charge and discharge, and efficient utilization of solar energy without waste, is possible.

Namely, the area occupied by the solar battery system to the number of solar battery panels is decreased, and the quantity of electric power needed in case of poor weather/environmental conditions is ensured. Further, when the solar battery system of the present invention is located in a sunny place facing the south, the present invention makes use of the valuable large quantity of power output generated by a large capacity solar battery, a large quantity of electric power is charged and stored into a storage battery, and the supply of a larger quantity of electric power into a load or loads can be automatically performed.

Further, it is another object of the present invention to provide a solar battery system which stores long-term data concerning charge and discharge in memory, so that the solar battery system has reliable data to ensure long-term, stable operation and reliable-maintaining function, and has a maintenance function based on such self-learning and self-diagnostic data stored into the memory, which can be used economically and without anxiety.

In order to attain the above-mentioned object, a solar battery system, as claimed in claim 1, is a solar battery system in which electric energy generated by a solar battery is stored in a storage battery and the stored electric energy may then be supplied to a load, wherein the solar battery system comprises a charge quantity detecting means for detecting the input charge quantity stored in the storage battery and a discharge quantity control means for controlling the output discharge quantity in accordance with data on the detected charge quantity obtained from the charge quantity detecting means.

In such solar battery system including a combination of solar battery and storage battery, output discharge quantity is controlled based on input charge quantity, needed electric energy is assured even in poor weather/environmental conditions, the solar battery system of the present invention, when installed in an ideal location, can make the best use of a large quantity of valuable output obtained from the large capacity solar battery, and a large quantity of electric energy is generated and stored in the storage battery so that the large supply of electric energy is made automatically available when needed. Accordingly, an economical and effective solar battery system can be realized.

A solar battery system as claimed in claim 2 is a solar battery system in which electric energy generated by a solar battery is stored in a storage battery, and the stored electric energy is supplied to a load, wherein the solar battery system comprises a charge quantity detecting means for detecting the charge quantity input into the storage battery, a discharge quantity detecting means for detecting the output discharge quantity, of electric energy charged into the storage battery, a storage means in which long-tern data on charge and discharge quantity of the storage battery detected by the charge quantity detecting means and the discharge quantity detecting means, and a discharge quantity control means for controlling the output discharge quantity in accordance with the data on charge and discharge quantity stored in the storage means.

In the above-mentioned embodiment, the solar battery can be operated stably and securely every day, over a long period of time. Further, more effective discharge quantity control can be achieved by accumulating data on charge and discharge quantity of the storage battery itself over a long period of time, by having the functions of self-learning and self-diagnostic, and by making efficient use of such functions to enable fine adjustment of the discharge quantity control means of the storage battery itself. Further, collected data on charge and discharge quantity can be used as valuable data for maintenance, quality control, and valuable area data, such as data on installation locations and weather factors for future development of solar energy products, as well as for utilization for obtaining higher reliability and good control.

A solar battery system as claimed in claim 3 is a solar battery system in which electric energy generated by a solar battery is stored in a storage battery, and the stored electric energy is supplied to a load, wherein the solar battery system comprises either a charge quantity detecting means for detecting the charge quantity input into the storage battery and a discharge quantity control means for controlling the output discharge quantity in accordance with the information on the detected charge quantity obtained from the charge quantity detecting means, or a charge quantity detecting means for detecting the charge quantity input into the storage battery, a discharge quantity detecting means for detecting the output discharge quantity, of electric energy stored in the storage battery, a storage means in which long-term data is stored on charge and discharge quantity of the storage battery detected by the charge quantity detecting means and the discharge quantity detecting means, and a discharge quantity control means for controlling the output discharge quantity in accordance with data on charge and discharge quantity stored in the storage means, and wherein the charge quantity detecting means is a charging voltage detecting means for detecting the charging voltage of the storage battery.

As a means for detecting charge and discharge electric energy, for example, an electric double layer condenser is used for the storage battery. Namely, electric energy of condenser is defined by the following equation:

$$W \cdot S = CV^2/2$$

wherein W S is charge electric energy, C is electrostatic capacity, V is terminal voltage. The charged electric energy can be detected by determining the terminal voltage of the electric double layers condenser.

Example, if C=100 V, V=3 V, $W \cdot S = CV^2/2 = 450 W \cdot sec = 0.125$ W·h. Thus, 450 Watts of electric power can be charged and stored for a second, or 0.125 Watts of electric power can be charged and stored for one hour.

A solar battery system as claimed in claim 4 is a solar battery system in which electric energy generated by a solar battery is stored in a storage battery and the stored electric energy is supplied to a load, wherein the solar battery system comprises either a charge quantity detecting means for detecting the charge quantity input into the storage battery and a discharge quantity control means for controlling the discharge quantity output to a load in accordance with the information on the detected charge quantity obtained from the charge quantity detecting means, or a charge quantity detecting means for detecting the charge quantity input into the storage battery, a discharge quantity detecting means for detecting the output discharge quantity supplied to the load, of electric energy charged into the storage battery, a storage means in which long-term data on charge and discharge quantity of the storage battery detected by the charge quantity detecting means and the discharge quantity detecting means is stored, and a discharge quantity control means for controlling the output discharge quantity in accordance with data on charge and discharge quantity stored in the storage means, and wherein the charge quantity detecting means is a charging voltage detecting means for detecting the charging voltage of the storage battery, and the charge quantity detecting means is an accumulated charged electric energy detecting means for detecting the accumulated charged electric energy stored in the storage battery.

A solar battery system as claimed in claim 5 is a solar battery system in which electric energy generated by a solar battery is stored in a storage battery and the stored electric energy is supplied to a load, wherein the solar battery system comprises either a charge quantity detecting means for detecting the charge quantity input into the storage battery and a discharge quantity control means for controlling the output discharge quantity in accordance with the information on the detected charge quantity obtained from the charge quantity detecting means, or a charge quantity detecting means for detecting the charge quantity input into the storage battery, a discharge quantity detecting means for detecting the output discharge quantity of electric energy stored in the storage battery, a storage means in which long-term data on charge and discharge quantity of the storage battery detected by the charge quantity detecting means and the discharge quantity detecting means is stored, and a discharge quantity control means for controlling the output discharge quantity in accordance with data on charge and discharge quantity stored in the storage means, and wherein the charge quantity detecting means is a charging voltage detecting means for detecting the charging voltage of the storage battery, and the charge quantity detecting means is a monitoring condenser charging voltage detecting means for detecting the charging voltage of a monitoring condenser connected in parallel with the storage battery.

In such an embodiment, the charge quantity detecting means for detecting the charge quantity input into the storage battery can simply include means for detecting the accumulated charged electric energy stored in the storage battery or means for detecting the charging voltage of a monitoring condenser connected in parallel with the storage battery.

Further, by controlling the charge and discharge quantity in accordance with the charge quantity, control of the power supply by supplying the desired power corresponding to the load is made possible, wherein the needed quantity of power is assured even in poor weather/environment conditions. Further, where the solar battery is installed in an ideal location, best use is made of the large quantity of valuable power output obtained from the large capacity solar battery by storing a large quantity of electric energy in the storage battery and making same available at will. Accordingly, an economical and effective solar battery system can be realized.

A solar battery system as claimed in claim 6 is a solar battery system as claimed in any of claims 1 through 5, wherein the discharge quantity control means of the solar battery system controls the output discharge quantity by pulse width modulation control, time control, output voltage control or output current control of the power output to the load or loads.

Accordingly, an appropriate optional method may be selected from the group consisting of pulse width modulation control, time (intermittent) control, output voltage control or output current control of the output to the load or loads.

A solar battery system as claimed in claim 7 is a solar battery system in which electric energy generated by a solar battery is stored in a storage battery and the stored electric energy is supplied to a load or loads, wherein the solar battery system comprises a charge quantity detecting means for detecting the charge quantity input into the storage battery, a discharge quantity detecting means for detecting the output discharge quantity supplied to the load or loads, of electric energy stored in the storage battery, a storage means in which long-term data on charge and discharge quantity of the storage battery detected by the charge quantity detecting means and the discharge quantity detecting means is stored, a discharge quantity control means for controlling the output discharge quantity to the load or loads in accordance with data on charge and discharge quantity stored in the storage means, and an output means for outputting the information on maintenance or alarm in accordance with data on charge and discharge quantity stored in the storage means.

Accordingly, data of the present command signal of all sorts of control elements and long-term recording data on charge and discharge based on past operation are stored in order of time into the storage means, and outputted from the storage means to a display means or to an external device and displayed. Further, long-term data concerning operation, reliability and maintenance are obtained and become available for purposes of developing plans for future maintenance, the time of exchange, alarm and learning of the causes of poor operation and/or power generation.

A solar battery system as claimed in claim 8 is a solar battery system claimed in any of claims 1 through 7, wherein the solar battery is comprised of a plurality of solar battery panels disposed perpendicular to the surface of installation of the system.

Accordingly, since the solar battery is comprised of a plurality of solar battery panels disposed perpendicular to the surface of area of installation of the system, the space needed for installation of the solar battery panels to the number thereof is relatively small, the energy generated by the solar battery panels and charge quantity of the storage battery may still be assured, and the solar battery is more protected from damage by animal droppings, snow, and the like.

As mentioned above, since the solar battery system of the present invention includes a combination of solar battery and storage battery, and the output discharge quantity is controlled in accordance with charge quantity input into the storage battery, needed electric energy is assured even in poor weather/environmental conditions. Further, when the solar battery system of the above embodiment is installed in an ideal location (such as a sunny place facing south), best use is made of the large quantity of valuable output obtained from the large capacity solar battery, and the large quantity of electric energy is and stored in the storage battery so that the large supply of electric energy is available at will. Accordingly, an economical and effective solar battery system can be realized.

Further, data of the present command signal concerning all sorts of control elements is sent and long-term recording data on charge and discharge based on past operation is stored in order of time into the storage means, and is transferred from the storage means to a display means or to an external device and displayed. In addition, information concerning long-term operation, reliability and maintenance are obtained and stored in data memory so that such information on maintenance, the time of exchange, alarm and indication of bad causes can be accessed.

Further, since the solar battery is comprised of a plurality of solar battery panels disposed perpendicular to the surface of installation of the system, the space needed for installation of the solar battery panels to the number thereof is small, the energy generated by the solar battery panels and the charge quantity of the storage battery is assured, and the solar battery is protected from damage by animal droppings, snow and the like.

BRIEF DESCRIPTION OF THE DRAWINGS

FIG. 3 is a chart of field applications of the solar battery according to the present invention.

DETAILED DESCRIPTION OF THE PREFERRED EMBODIMENTS

Figure 1:
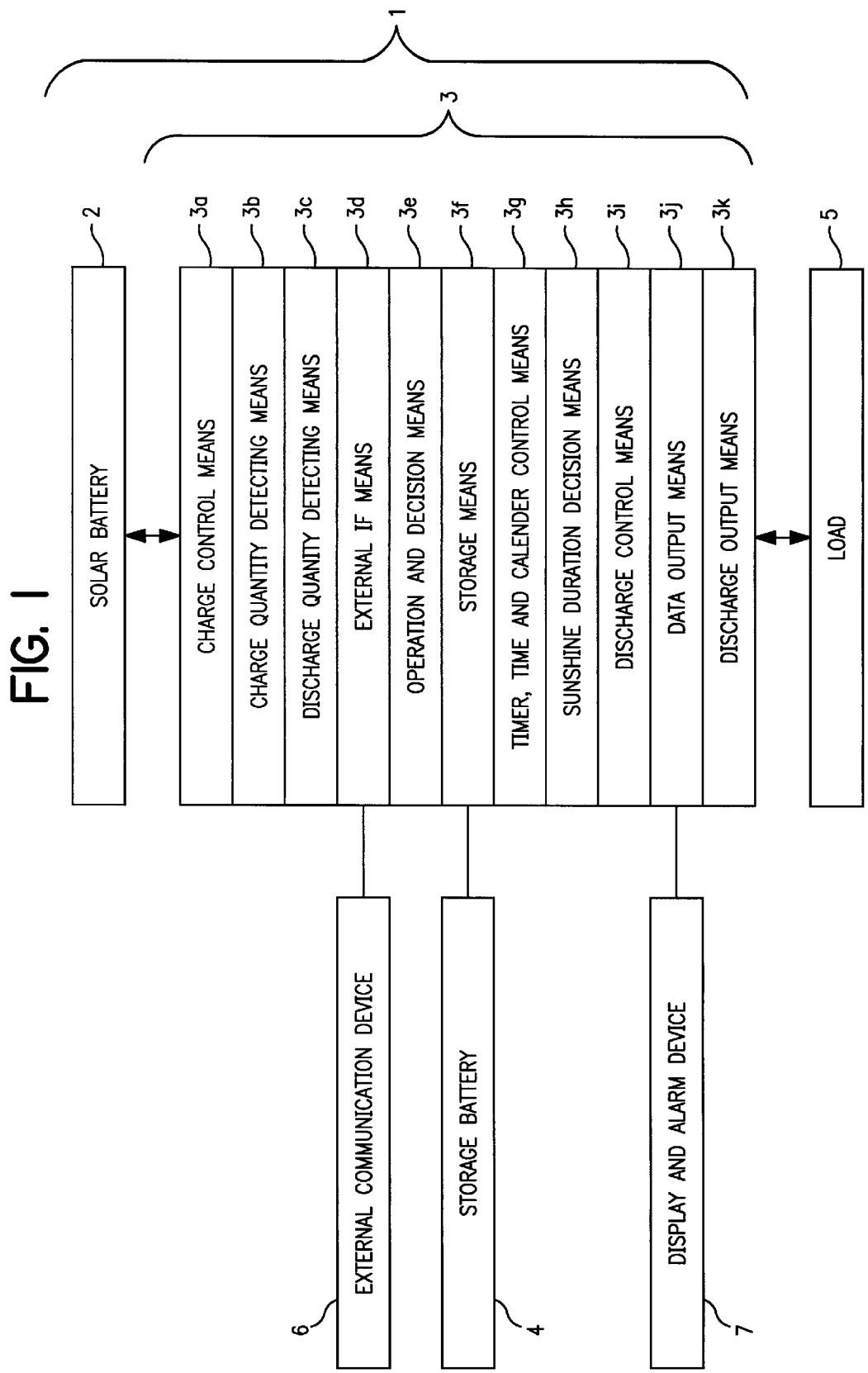
FIG. 1 is a block diagram illustrating the basic structure the solar battery system according to the present invention.

As shown in FIG. 1, a solar battery system 1 is comprised of solar battery 2 composed of a plurality of solar battery panels, a discharge quantity control device 3 as a discharge quantity control means including a charge quantity detecting means 3b and for controlling the output discharge quantity to a load 5 in accordance with the charge quantity detection information sent from the charge quantity detecting means 3b, a storage battery 4, an external sensor and communication device 6, and a display and alarm device 7 as an output means for outputting the maintenance information or alarm according to data obtained on charge and discharge quantity stored in a storage means 3f of the discharge quantity control device 3, wherein the discharge quantity control device 3 supplies electric power to the load 5.

Hereupon, a plurality of solar battery panels of the solar battery 2 are mounted, perpendicular to the surface of installation of the system, on the side of the apparatus so that the area needed for installation of the solar battery 2 is small, and the solar battery 2 can be protected from damage by animal droppings, snow and the like.

The discharge quantity control device 3 is comprised of a charge control means 3a, the charge quantity detecting means 3b for detecting the charge quantity inputted into the storage battery 4, a discharge quantity detecting means 3c, an external interface means (hereinafter referred to as "external IF means") 3d, an operation and decision means 3e, the storage means 3f into which the long-term data on charge and discharge quantity of the storage battery 4 detected by the charge quantity detecting means 3b and the discharge quantity detecting means 3c is stored, a timer, time and calendar control means 3g, a sunshine duration decision means 3h, a discharge control means 3i, a data output means 3j, and a discharge output means 3k.

In such an embodiment according to the present invention, electric energy sent from the solar battery 2 is stored in the storage battery 4, and the stored electric energy is supplied to the load 5, wherein the discharge quantity of power output is controlled according to the charge quantity of the storage battery 4 by various means of the discharge means 3 and, at the same time, assurance of the most suitable operation, maintenance, and reliability is obtained based on the data output sent from the external sensor and communication device 6, and the content of various data memory concerning state of operation is displayed in a display and alarm device 7, wherein the external sensor communication device 6 includes a sensor for detecting environmental temperature and humidity and a communication device for sending an external signal and others.

The charge control means 3a functions so as to allow for smooth charging. For example, restriction is made on charged electric current and overcharging is prevented in the case where output of the solar battery 2 charges the storage battery 4.

The charge quantity detecting means 3b is comprised of, for example, a charging voltage detecting means for detecting the charging voltage of the storage battery 4 through the resistance of voltage divider, an accumulated charged electric energy detecting means for detecting the accumulated charged electric energy in the storage battery 4, and a monitoring condenser charging voltage detecting means for detecting the charging voltage of a monitoring condenser, wherein the charge quantity detecting means 3b is a means for detecting how much the storage battery is charged.

The discharge quantity detecting means 3c is a means for detecting the discharged quantity of the storage battery 4, and for detecting how much electric energy is supplied to the load 5. The external IF means 3d is a means for level-adjusting a detected analog signal and the below-mentioned output of the external sensor and communication device 6, to convert the detected analog signal and the output of the external sensor and communication device into a digital signal, and supplies the converted signal and output to a next stage operation and decision means 3e.

The operation and decision means 3e is comprised of a microcomputer, and a signal processing means for controlling the discharge quantity control device 3, wherein the detection signal of the above-mentioned detecting means, and the decision signal of the sunshine duration decision means 3h and external signal are inputted into the operation and decision means 3e, while a control signal is digital-processed together with various command signals of the storage means 3f outputted to the discharge quantity control means 3i.

Further, the output of the operation and decision means 3e is stored in the storage means 3f, being adapted to the date and time signals of the timer, time and calendar control means 3g. The storage means 3f can include various types of memory. However, it preferably includes an exchangeable memory such as a memory card and MO (magnet-optic disc), so that individual control is possible based on the load 5.

Then, data of the present command signal of from the various control elements, including data based on past control stored in order of time into the stored means 3f is sent from the storage means 3f to a display means or to an external device and displayed. Further, information on maintenance, the time of exchange, alarm and causes of problems can be relayed via a self-learning and self-diagnostic functional device based on the data obtained from data memory.

The sunshine duration decision means 3h is a means for deciding whether the weather is preferable for power generation, is undesirable for same, such as rainy weather or cloudy weather, whether it is nighttime, by detecting output voltage or output current of the solar battery 2.

The discharge control means 3i controls the next stage discharge output means 3k by command signal as controls signal sent from the microcomputer of the operation and decision means 3e. The discharge output means 3k is comprised of a power transistor, as well as other elements, which supplies the needed electric power to the load 5 in accordance with the control signal.

The solar battery system 1 described above may be used in various fields including (1) light and illumination field, (2) power field, (3) information and communication field and (4) other field classified roughly in a table as shown in FIG. 3. Accordingly the charge and discharge control adaptable to the operational characteristics of the load 5 is needed.

For example, in the light and illumination field in particular, if the installation location is exposed to open daylight in fine weather, strong illumination is possible, but in case of rainy or cloudy weather, strong illumination at night may not be possible if power is not adequately controlled during daylight hours. Therefore, the loads 5 can be accommodated to illumination requirements by adjusting the number of the loads 5 (supplied electric power), and by controlling output discharge quantity according to the accumulated quantity of electricity.

Further, in the power field, where constant continuous power is frequently required, in cases where the solar battery is installed in the shade in rainy weather, only the minimum needed quantity of electric power is supplied by controlling output discharge quantity according to the accumulated quantity of electricity.

Where the solar battery is installed in a sunny location facing south, a large quantity of power is generated and stored by making the best use of the large output sent specially from the large storage solar battery system 1. Therefore, the load 5 created by the need for constant continuous power can be accommodated by supplying a large quantity of electric power to a larger number of loads 5.

The power output of the solar battery 2 is smoothly generated and stored in the storage battery 4 while the restriction on charging current and the prevention of overcharge are made by the charge control means 3a. Simultaneously, the charge quantity detecting means 3b, which is composed, for example, a charging voltage detecting means for detecting the charging voltage of the storage battery 4 through the resistance of voltage divider, the accumulated charged electric energy detecting means for detecting the accumulated charged electric energy of the storage battery 4, or the monitoring condenser charging voltage detecting means connected in parallel with the storage battery 4, detects how much the storage battery 4 is charged.

Further, the discharge quantity detecting means 3c detects the discharging quantity of the storage battery 4 in order to measure the quantity of electric power supplied to the load 5. The detected analog signal and the above-mentioned output of the external sensor and communication device 6 are level-adjusted, converted into digital signals by the external IF means 3d, and then supplied to the next stage operation and decision means 3e.

The operation and decision means 3e is comprised of a microcomputer, and a signal processing means for controlling the discharge quantity control device 3, wherein the detection signal of the above-mentioned detecting means, and the external signal are inputted into the operation and decision means 3e, while the control signal and appropriate various command signals corresponding to the load of the storage means 3f are digitally-processed, and outputted to the discharge control means 3i.

Further, the output of the operation and decision means 3e, which includes the present command signal of all of the control elements and the command signals based on past control, is stored in order of time into the storage means 3f according to the date and time signals of the timer, time and calendar control means 3g.

Then, the command signal sent from the microcomputer of the operation and decision means 3e is inputted into the discharge control means 3i. Further, the sunshine duration decision means 3h decides whether the weather is optimal, or poor (such as shady, rainy or cloudy, or whether it is nighttime, by measuring magnitudes of output voltage or output current of the solar battery 2, and a signal based on such measurements is sent to the discharge control means 3i.

The control signal of the discharge control means 3i, which controls the output discharge quantity output to the output 5 in accordance with the charged quantity in the storage battery 4, controls the next discharge output means 3k. And, the discharge output means 3k, comprised of a power transistor supplies the needed electric power to the load 5.

Figure 2:
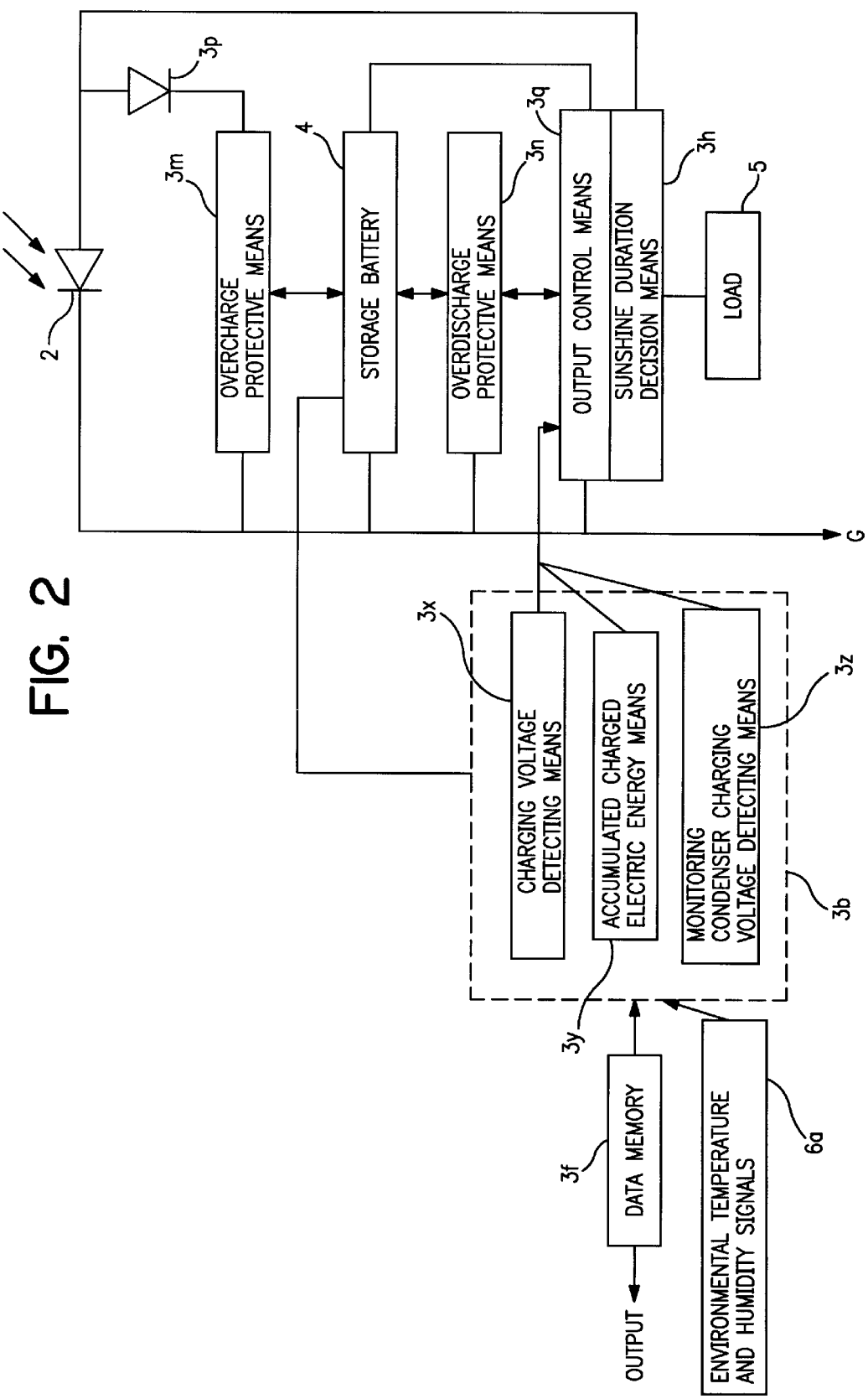
FIG. 2 is a block diagram illustrating an example of a method of control of a control unit for controlling discharge quantity of the solar battery system according to the present invention.

As shown in FIG. 2, "3p" designates a Shotky barrier diode for prevention of reverse current, "3m" designates an overcharge protective means, "3n" designates an overdischarge protective means, "3q" designates an output control means, "3x" designates a charging voltage detecting means, "3y" is an accumulated charged electric energy detecting means, and "3z" is a monitoring condenser charging voltage detecting means, wherein the charging voltage detecting means 3x, the accumulated charged electric energy detecting means 3y and the monitoring condenser charging voltage detecting means 3z comprise the charge quantity detecting means 3b. "6a" designates an environmental temperature and humidity signals.

The charge control means 3a charges the storage battery 4 with electric energy generated in the solar battery 2, through a Shotky barrier diode 3p for prevention of reverse current and an overcharge protective means 3m. Electric power is supplied from the storage battery 4 to the load 5 through the overdischarge protection means 3n and the output control means 3q comprised of the discharge control means 3i and the discharge output means 3k, wherein the supply of electric power to the load 5 is controlled by the output control means 3q.

Detection signals of any of the charging voltage detecting means 3x for detecting the charging voltage of the storage battery 4, the accumulated charged electric energy detecting means 3y for detecting the accumulated electric energy, or the monitoring charging voltage detecting means 3z for monitoring and detecting the charging voltage is inputted into the discharge control means 3i of the output control means 3q.

Further, the sunshine duration decision means 3h decides whether or not the weather is optimal for power generation, whether it is nighttime, for example by magnitudes of output voltage or output current of the solar battery 2, and a corresponding signal is sent to the discharge control means 3i of the output control means 3q.

Then, in optimal weather, as a large quantity of electric energy is produced, output discharge quantity need not be kept constant because of the assurance of charge and discharge in poor weather or non-optimal environmental conditions, but rather the control of output to the load 5 may be made in such a manner that a large quantity of electric energy is supplied to a large number of the loads 5.

When the solar battery system of the present invention is in the shade or rainy or cloudy weather, the output control means 3q assures adequate charge and discharge operation, wherein power output stored in the storage battery 4, together with the conventional control system.

Command signals are sent from the storage means 3f, in which various command signals of control elements and environmental temperature and humidity signals 6a of the external sensor and communication device 6 are inputted to the charge quantity detecting means 3b, and are used as control elements. The present command signal comprised of various current control elements and data concerning past control are stored in order of time into the storage means 3f, and are outputted to a display means or an external device to be displayed on the display means or the external device.

Further, information concerning maintenance, the time of exchange, alarm and indications of problems can be outputted by a self-learning and self-diagnostic function based on the data collected and stored in the data memory provided in the storage means 3f.

As the method of discharge quantity control made by the output control method 3q, appropriate arbitrary methods can be applied which are selected from among pulse width modulation (PMW) control, time (intermittent) control, output voltage control, output current control and others in accordance with the loads 5.

What is claimed is:

1. A solar battery system in which the electric energy generated by a solar battery is stored in a storage battery, which is supplied to a load or loads, comprising:

a solar battery which generates a charge quantity;

a storage battery which receives an input charge quantity from the solar battery;

a charge quantity detecting means for detecting the input charge quantity inputted into the storage battery;

a discharge quantity detecting means for detecting an output discharge quantity of electric energy discharged from the storage battery;

a storage means in which long-term data concerning charge and discharge quantity of the storage battery detected by the charge quantity detecting means and the discharge quantity detecting means is stored; and a discharge quantity control means for controlling an output discharge quantity based on data concerning charge and discharge quantity stored in the storage means.

2. The solar battery system as claimed in claim 1, wherein the solar battery system further comprises an output means for outputting information concerning maintenance or alarm in accordance with data concerning charge and discharge quantity stored in the storage means.

3. The solar battery system of claim 1, wherein the charge quantity detecting means is a charging voltage detecting means for detecting the charging voltage of the storage battery.

4. The solar battery system of claim 1, wherein the charge quantity detecting means is an accumulated charged electric energy detecting means for detecting the accumulated charged electric energy charged into the storage battery.

5. The solar battery system of claim 1, wherein the charge quantity detecting means is a monitoring condenser charging voltage detecting means for detecting the charging voltage of a monitoring condenser connected in parallel with the storage battery.

6. The solar battery system of claim 1, wherein the discharge quantity control means controls the output discharge quantity to the load or loads by pulse width modulation control, time control, output voltage control or output current control of the output to the load or loads.

7. The solar battery system of claim 3, wherein the discharge quantity control means controls the output discharge quantity to the load or loads by pulse width modulation control, time control, output voltage control or output current control of the output to the load or loads.

8. The solar battery system of claim 4, wherein the discharge quantity control means controls the output discharge quantity to the load or loads by pulse width modulation control, time control, output voltage control or output current control of the output to the load or loads.

9. The solar battery system of claim 5, wherein the discharge quantity control means controls the output discharge quantity to the load or loads by pulse width modulation control, time control, output voltage control or output current control of the output to the load or loads.

10. The solar battery system of claim 1, wherein the solar battery comprises a plurality of solar battery panels disposed perpendicularly to a surface of installation of the system.

11. The solar battery system of claim 3, wherein the solar battery comprises a plurality of solar battery panels disposed perpendicularly to a surface of installation of the system.

12. The solar battery system of claim 4, wherein the solar battery comprises a plurality of solar battery panels disposed perpendicularly to a surface of installation of the system.

13. The solar battery system of claim 5, wherein the solar battery comprises a plurality of solar battery panels disposed perpendicularly to surface of installation of the system.

14. The solar battery system of claim 6, wherein the solar battery comprises a plurality of solar battery panels disposed perpendicularly to a surface of installation of the system.

15. The solar battery system of claim 2, wherein the solar battery comprises a plurality of solar battery panels disposed perpendicularly to a surface of installation of the system.

* * * * *